(12) United States Patent
Sugita

(10) Patent No.: US 8,179,617 B2
(45) Date of Patent: May 15, 2012

(54) PHOTOGRAPHIC LENS AND IMAGE PICKUP APPARATUS HAVING THE SAME

(75) Inventor: Shigenobu Sugita, Shimotsuke (JP)

(73) Assignee: Canon Kabushiki Kaisha, Tokyo (JP)

( * ) Notice: Subject to any disclaimer, the term of this patent is extended or adjusted under 35 U.S.C. 154(b) by 189 days.

(21) Appl. No.: 12/705,920

(22) Filed: Feb. 15, 2010

(65) Prior Publication Data
US 2010/0208367 A1     Aug. 19, 2010

(30) Foreign Application Priority Data

Feb. 17, 2009  (JP) ................................. 2009-034039

(51) Int. Cl.
*G02B 13/04*     (2006.01)
(52) U.S. Cl. ...................................... 359/749; 359/753
(58) Field of Classification Search .................. 359/749, 359/750, 751, 752, 753
See application file for complete search history.

(56) References Cited

U.S. PATENT DOCUMENTS

| | | | |
|---|---|---|---|
| 5,805,349 A | 9/1998 | Sato | |
| 6,621,645 B2 | 9/2003 | Sato | |
| 6,687,061 B2 * | 2/2004 | Sensui | 359/749 |
| 6,697,202 B2 | 2/2004 | Mori | |
| 7,215,481 B2 * | 5/2007 | Ogata | 359/682 |
| 7,589,905 B2 * | 9/2009 | Sugita | 359/677 |
| 8,000,035 B2 * | 8/2011 | Harada | 359/749 |

FOREIGN PATENT DOCUMENTS

JP     62-291613 A     12/1987

* cited by examiner

*Primary Examiner* — David N Spector
(74) *Attorney, Agent, or Firm* — Canon USA Inc. IP Division

(57) ABSTRACT

A photographic lens includes, in order from an object side to an image side, a first lens unit having a negative refractive power, a second lens unit having a positive refractive power, a stop, and a third lens unit having a positive refractive power. In the photographic lens, the third lens unit moves towards the object side while the second lens unit moves towards the image side during focusing from an infinitely distant object to a closest distance object. In addition, in the photographic lens, an image forming magnification of the second lens unit during focusing on a closest distance object is appropriately set.

6 Claims, 13 Drawing Sheets

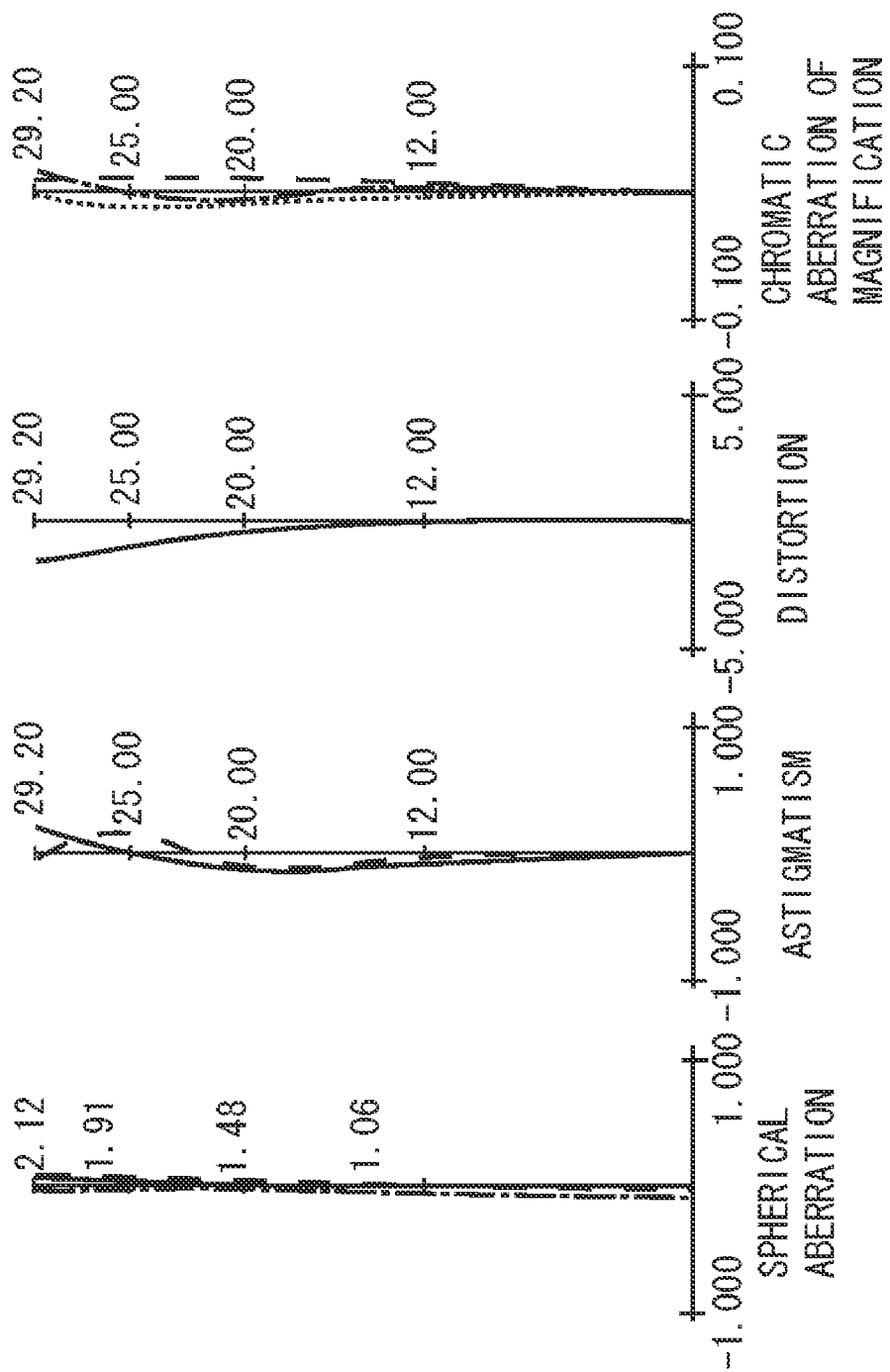

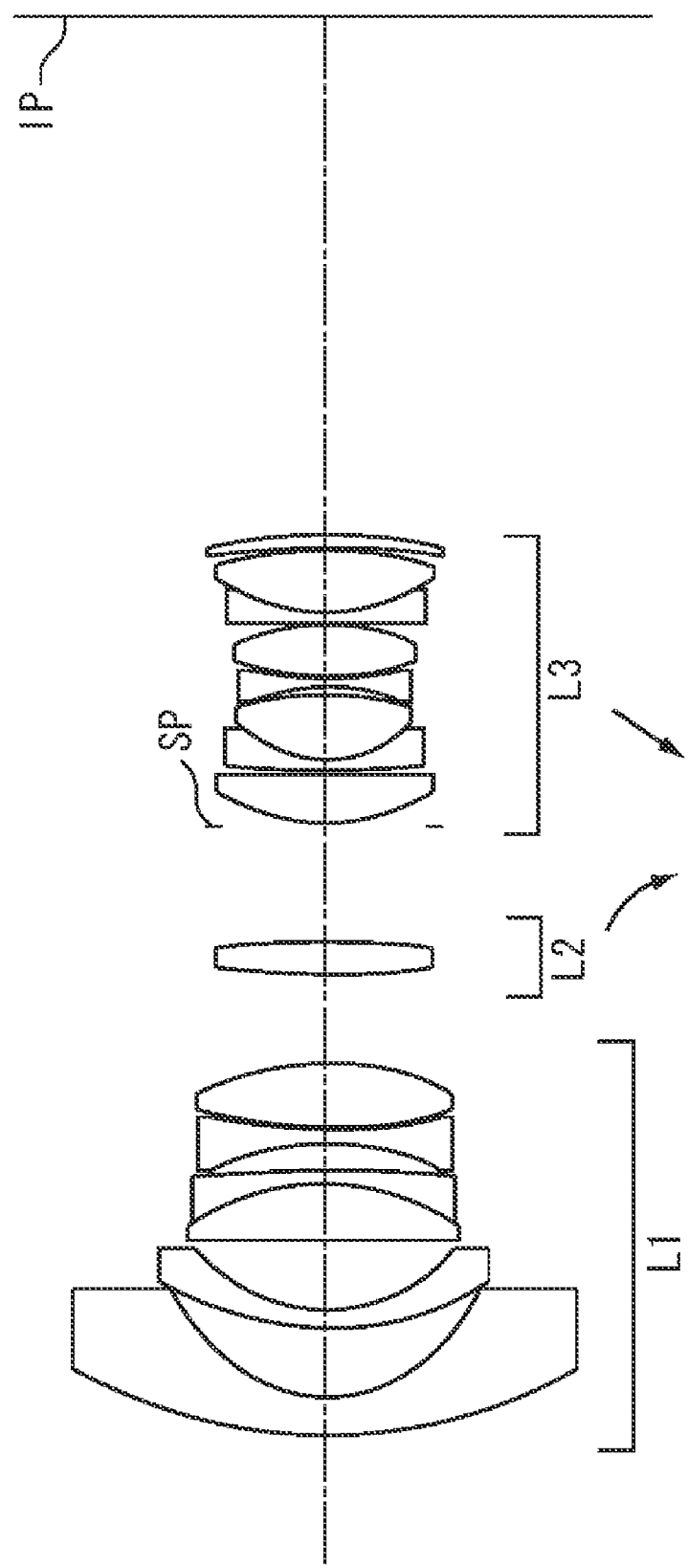

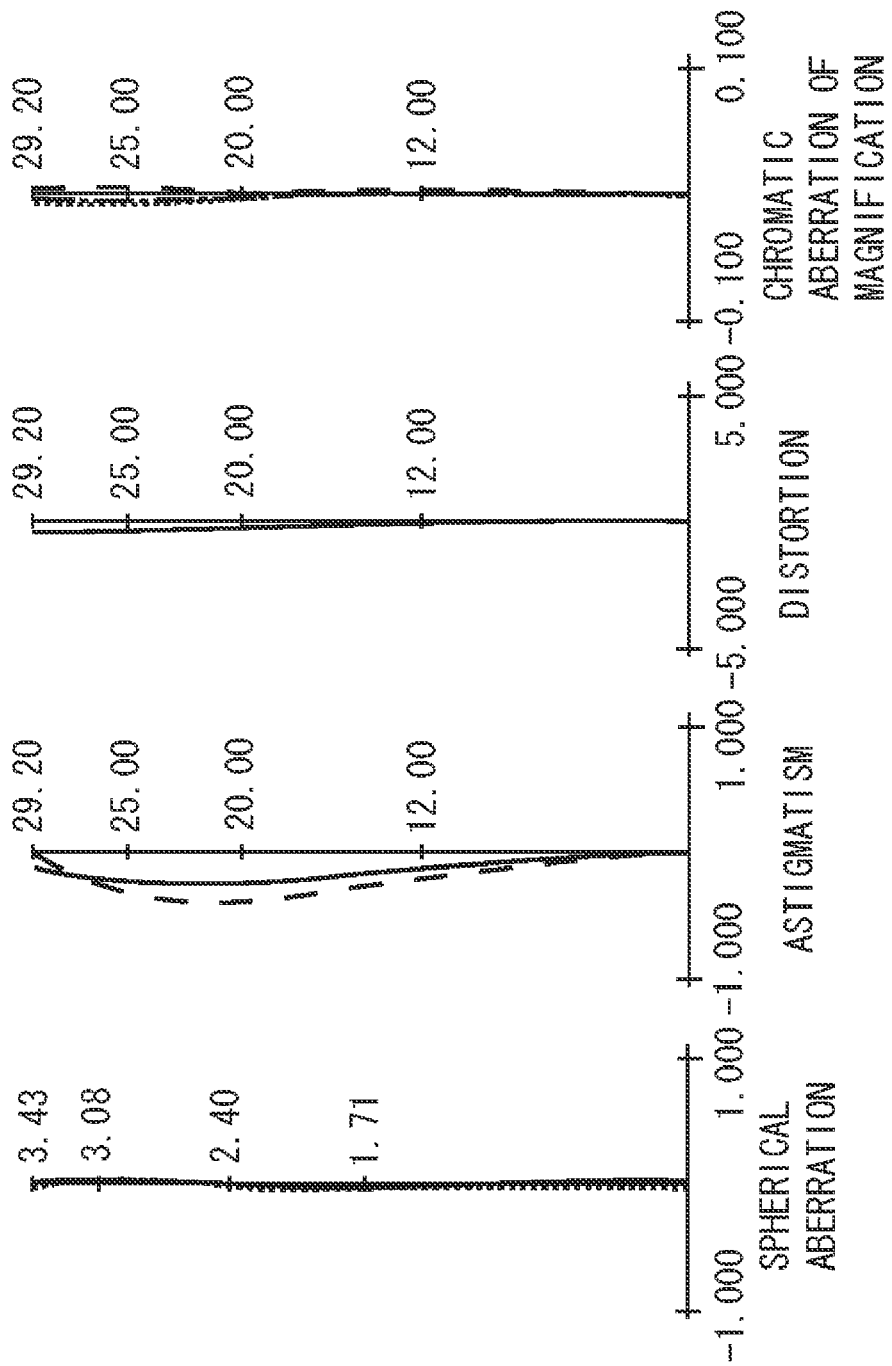

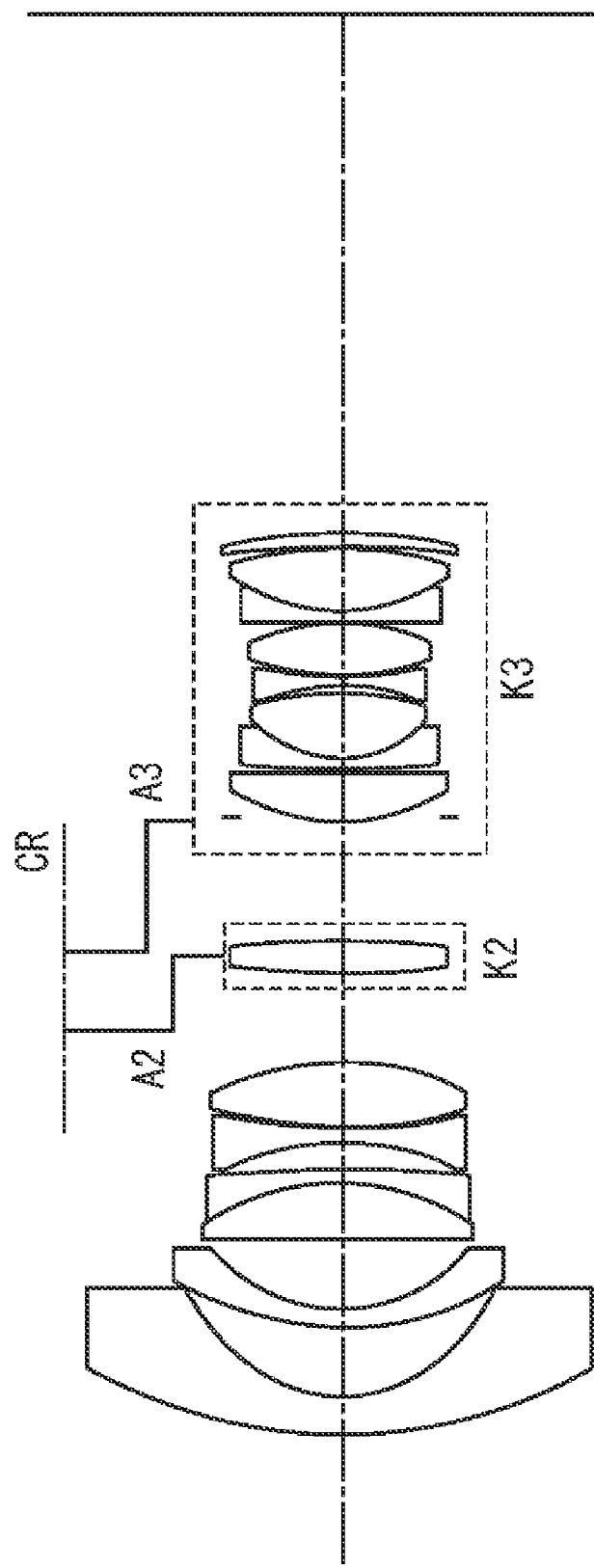

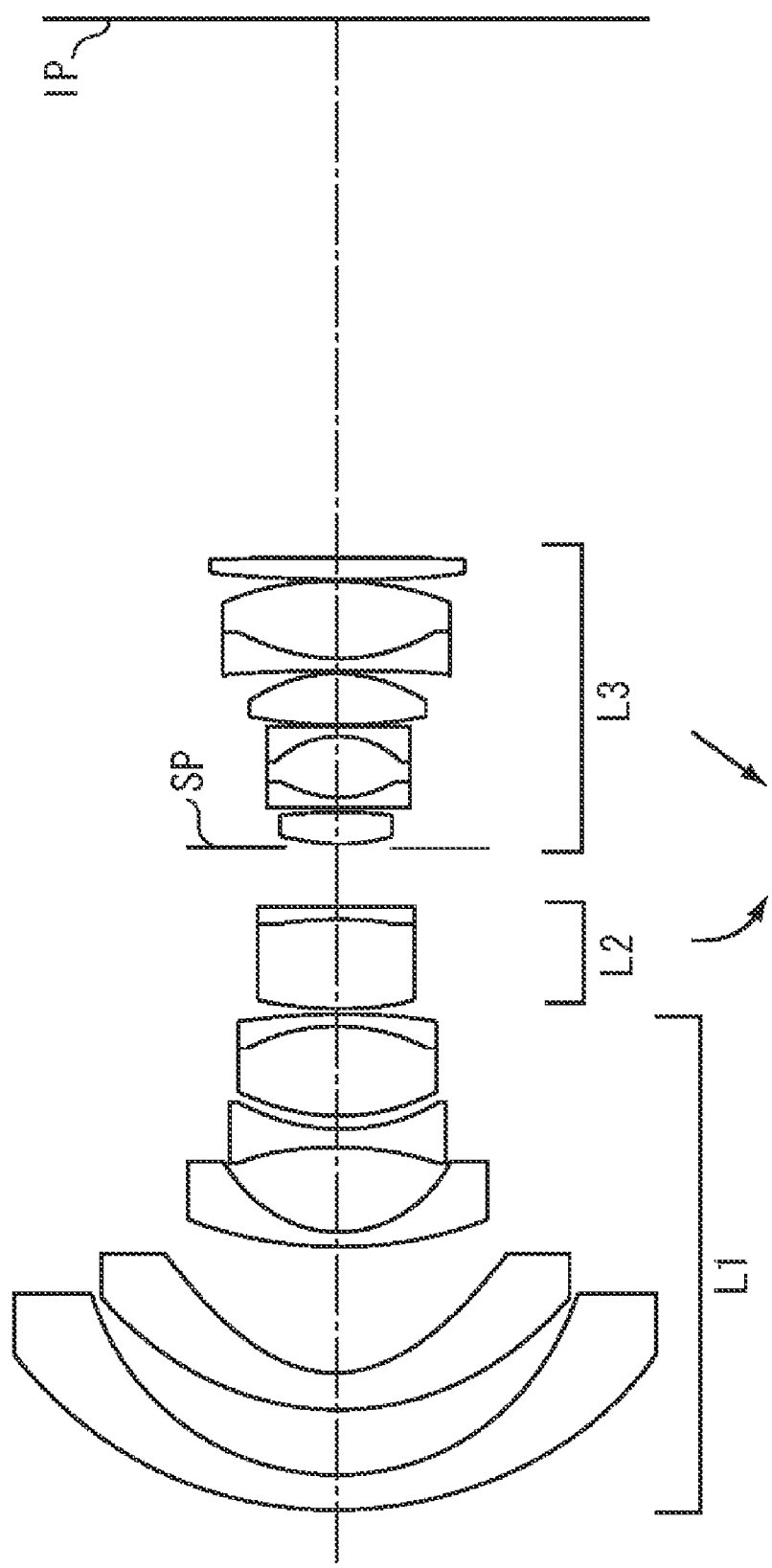

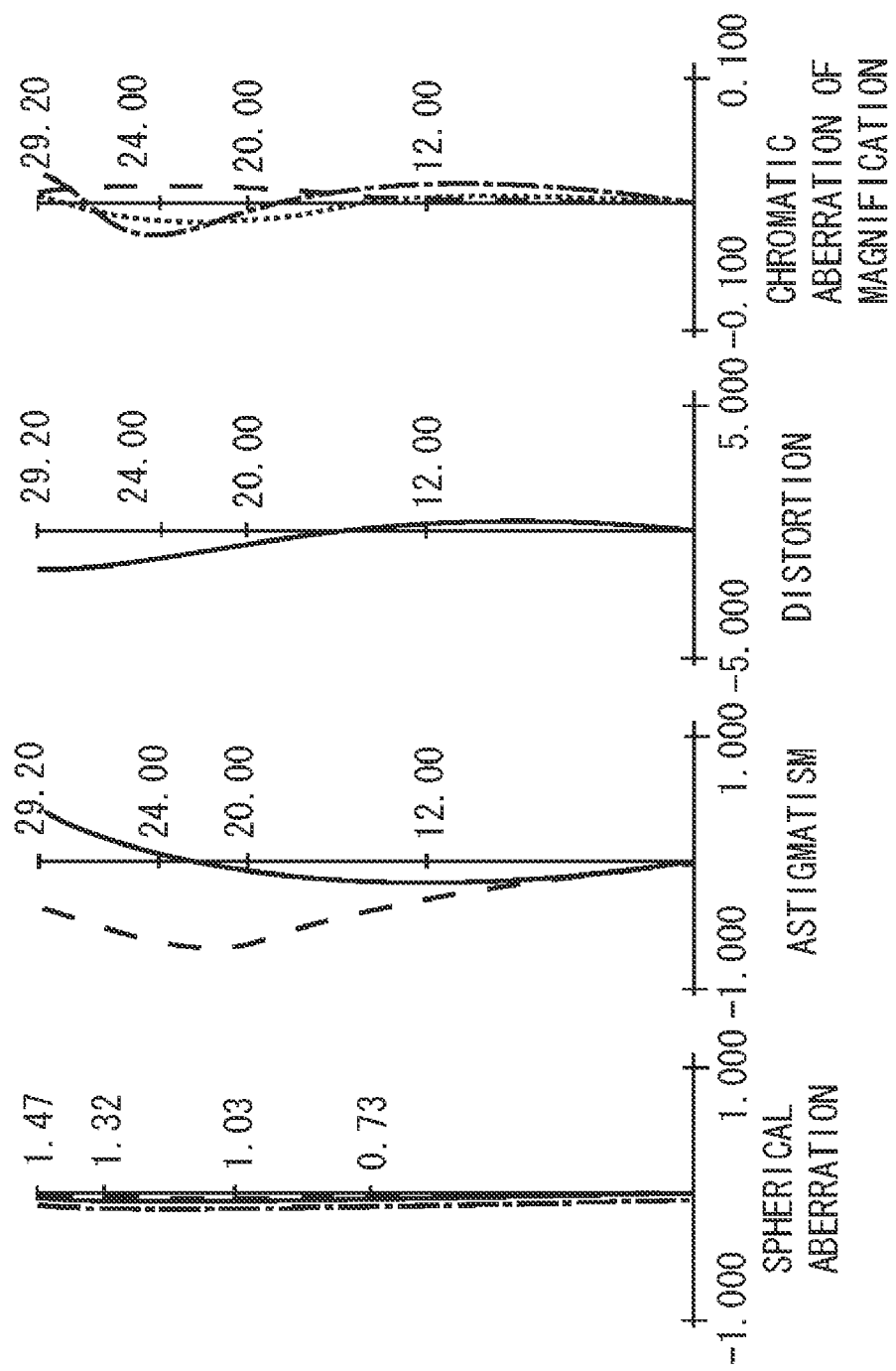

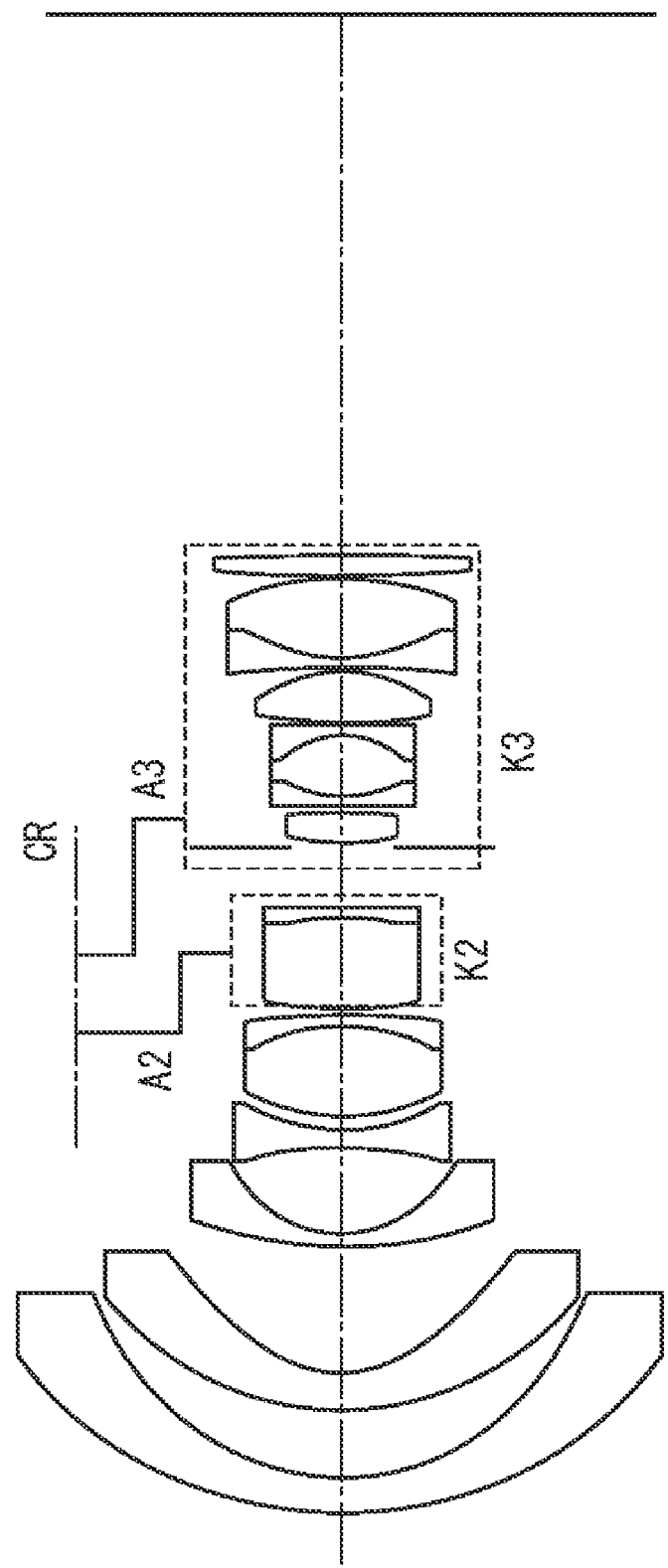

PHOTOGRAPHIC LENS AND IMAGE PICKUP APPARATUS HAVING THE SAME

BACKGROUND OF THE INVENTION

1. Field of the Invention

The present invention relates to a photographic lens configured to reduce variation on an image plane that may occur during focusing.

2. Description of the Related Art

It is desired by the market that a photographic lens used in a single-lens reflex camera has a relatively long back focus to secure a space for providing a mirror of the camera.

In a so-called retrofocus type photographic lens, in which a front lens unit having a negative refractive power is disposed on an object side of a stop and a rear lens unit having a positive refractive power is disposed on an image side of the stop, the position of a rear principal point of the entire optical system can be located at a position relatively close towards the image side. Accordingly, by using a retrofocus type photographic lens, a relatively long back focus can be achieved.

A photographic lens discussed in each of U.S. Pat. Nos. 6,621,645 and 6,697,202 executes focusing on a closest distance object by moving a rear lens unit having a positive refractive power towards the object side. In this case, however, a large amount of variation on the image plane may occur because in a front lens unit having a negative refractive power, the height of a principal ray of an off-axis light flux H may greatly vary during focusing.

In order to reduce variation on the image plane that may occur during focusing on a closest distance object, a conventional photographic lens executes focusing by moving a plurality of lens units. For example, a photographic lens discussed in Japanese Patent Application Laid-Open No. 62-291613 executes focusing on a closest distance object by moving a front lens unit having a negative refractive power and a rear lens unit having a positive refractive power towards the object side.

However, because the front lens unit having a negative refractive power includes a plurality of negative lenses of a great lens diameter, the weight of the front lens unit becomes great. Therefore, characteristics of response of an automatic focusing function may degrade.

A photographic lens discussed in U.S. Pat. No. 5,805,349 includes, in order from the object side to the image side, a first lens unit having a negative refractive power, a second lens unit (a front lens unit of a second lens unit) having a positive refractive power, a stop, and a third lens unit (a rear lens unit of the second lens unit) having a positive refractive power. In addition, in the photographic lens discussed in U.S. Pat. No. 5,805,349, during focusing on a closest distance object, the first lens unit stays stationary while the second lens unit and the third lens unit are moved towards the object side.

However, in the photographic lens discussed in U.S. Pat. No. 5,805,349, because an image forming magnification of the second lens unit is smaller than the equal magnification, focusing on a closest distance object is executed by moving the second lens unit towards the object side.

Therefore, the height of passage of a principal ray of an off-axial light flux may greatly vary. Accordingly, in the above-described conventional method, it is difficult to reduce variation on the image plane.

SUMMARY OF THE INVENTION

According to an aspect of the present invention, a photographic lens includes, in order from an object side to an image side, a first lens unit having a negative refractive power, a second lens unit having a positive refractive power, a stop, and a third lens unit having a positive refractive power. In the photographic lens, during focusing from an infinitely distant object to a closest distance object, the third lens unit moves towards the object side while the second lens unit moves towards the image side. In addition, in the photographic lens, an image forming magnification of the second lens unit during focusing on a closest distance object ($\beta 2N$) satisfies the following condition:

$$\beta 2N > 1.$$

According to an exemplary embodiment of the present invention, a photographic lens whose variation on the image plane that may occur during focusing is small can be achieved.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIGS. 2A and 2B are aberration charts of the photographic lens according to the first exemplary embodiment of the present invention.

FIG. 4 is a lens cross section of a photographic lens according to a second exemplary embodiment of the present invention.

FIGS. 5A and 5B are aberration charts of the photographic lens according to the second exemplary embodiment of the present invention.

FIG. 6 illustrates an example of a mechanism for retaining the photographic lens according to the second exemplary embodiment of the present invention.

FIG. 7 is a lens cross section of a photographic lens according to a third exemplary embodiment of the present invention.

FIGS. 8A and 8B are aberration charts of the photographic lens according to the third exemplary embodiment of the present invention.

FIG. 9 illustrates an example of a mechanism for retaining the photographic lens according to the third exemplary embodiment of the present invention.

DESCRIPTION OF THE EMBODIMENTS

Figure 1:
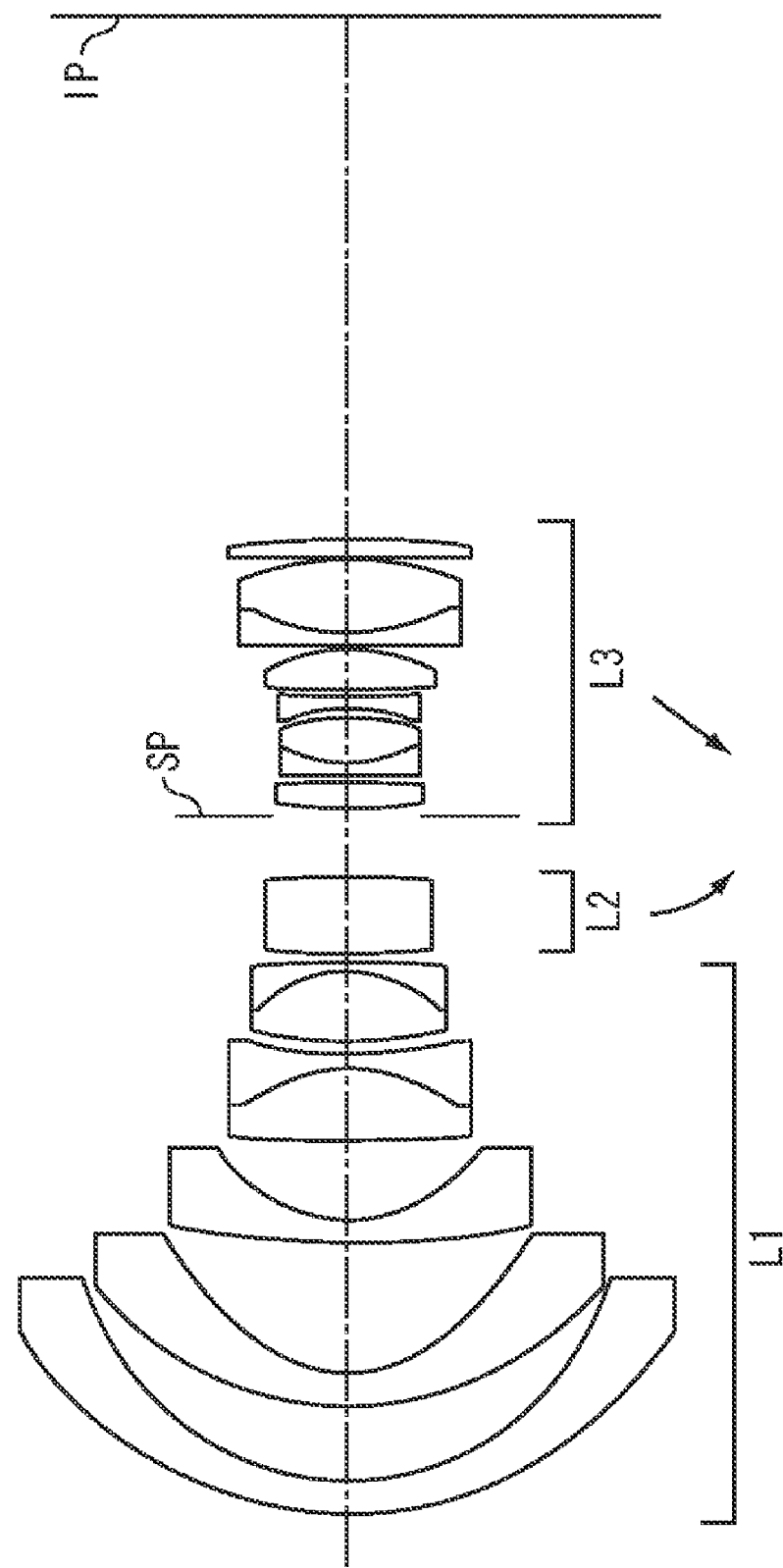
FIG. 1 is a lens cross section of a photographic lens according to a first exemplary embodiment of the present invention.

Various exemplary embodiments of the present invention will now be described in detail with reference to the drawings. It should be noted that the relative arrangement of the components, the numerical expressions, and numerical values set forth in these embodiments do not limit the scope of the present invention unless it is specifically stated otherwise.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and F number, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Note that herein when referring to correcting or corrections of an error (e.g., aberration), a reduction of the error and/or a correction of the error is intended.

A photographic lens according to an exemplary embodiment of the present invention includes, in order from an object side to an image side, a first lens unit having a negative refractive power, a second lens unit having a positive refractive power, a stop, and a third lens unit having a positive refractive power. In the photographic lens, each lens unit and the stop are moved during focusing.

Figure 2B:
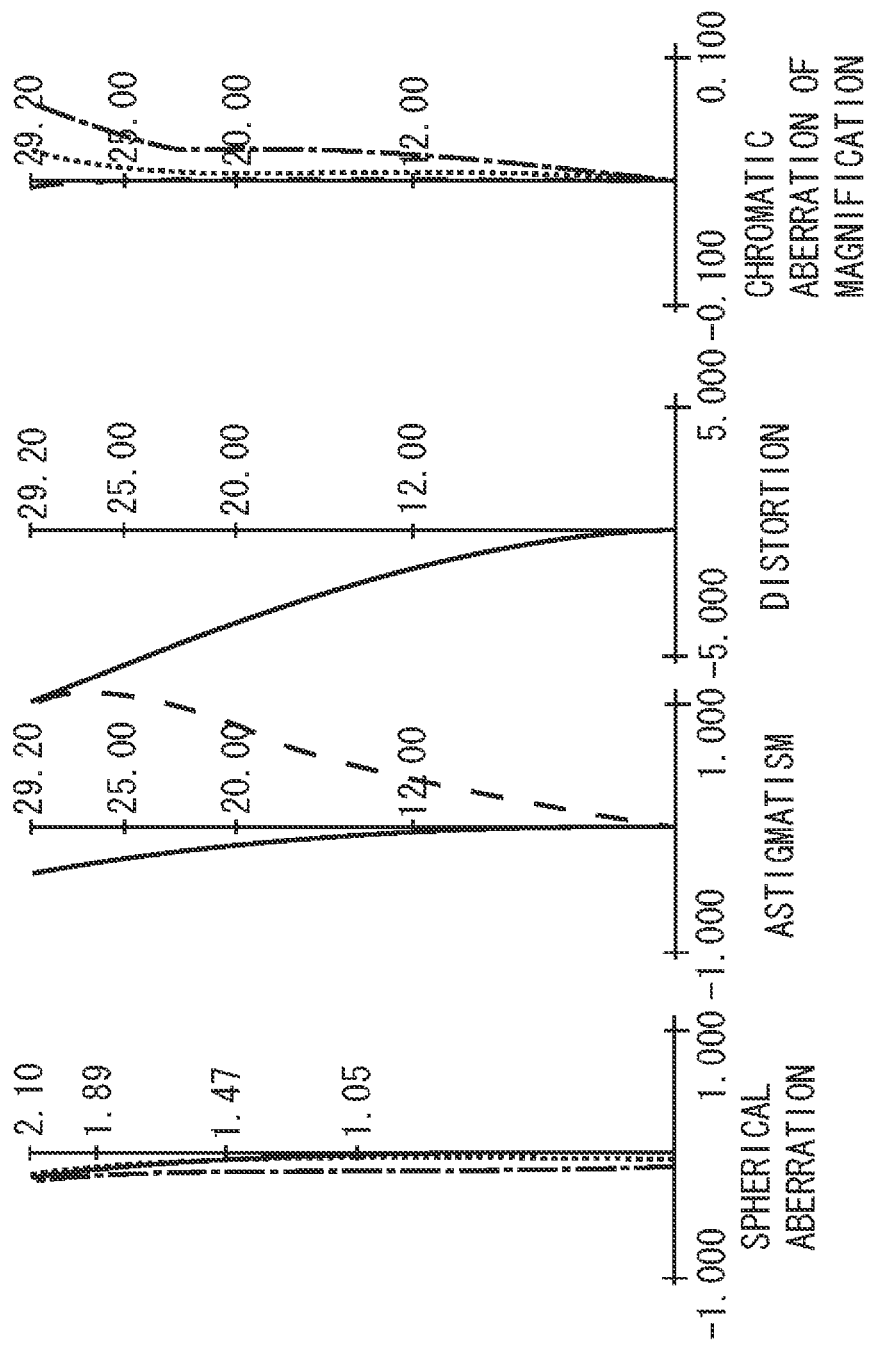
Figure 3:
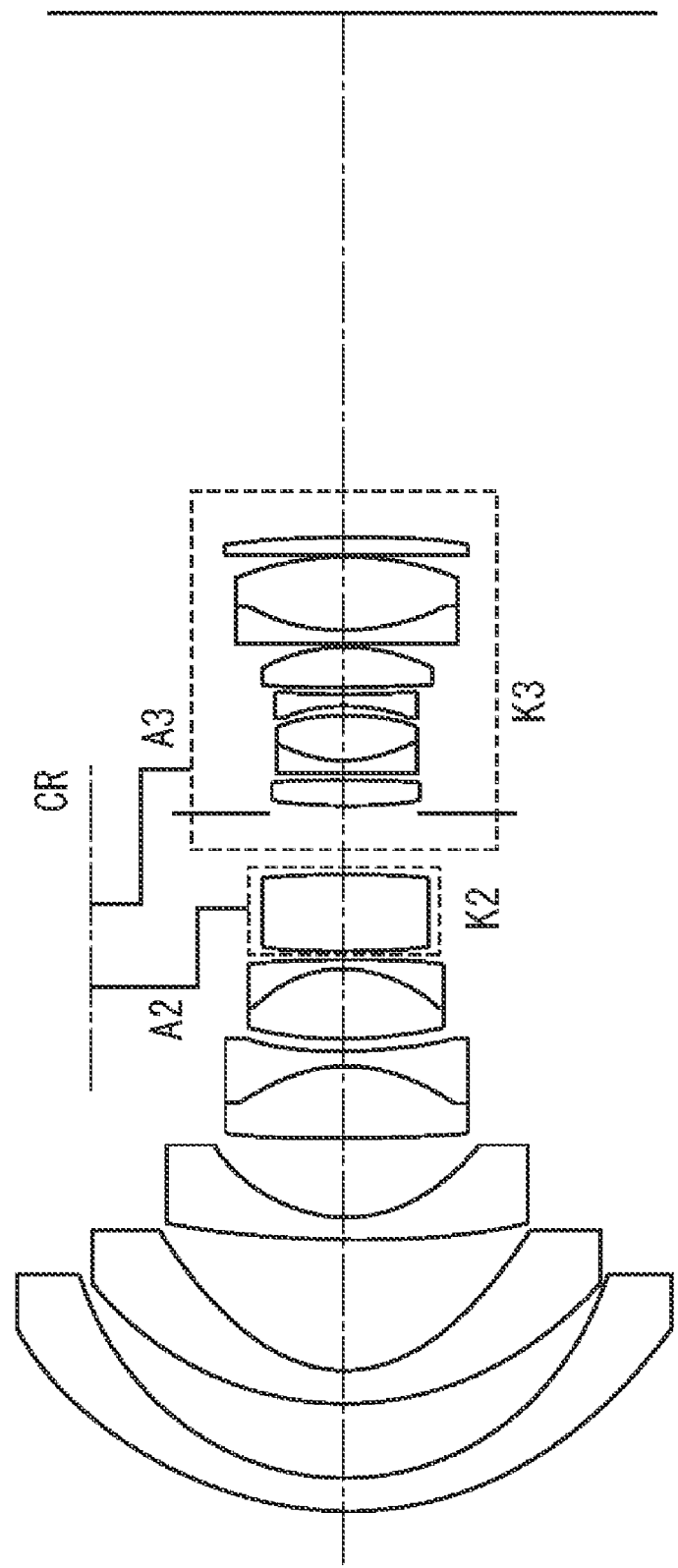
FIG. 3 illustrates an example of a mechanism for retaining the photographic lens according to the first exemplary embodiment of the present invention.

FIG. 1 is a lens cross section of a photographic lens according to a first exemplary embodiment of the present invention. FIGS. 2A and 2B are aberration charts of the photographic lens according to the first exemplary embodiment of the present invention. FIG. 3 illustrates examples of mechanisms for moving and retaining the photographic lens according to the first exemplary embodiment of the present invention.

Figure 5B:
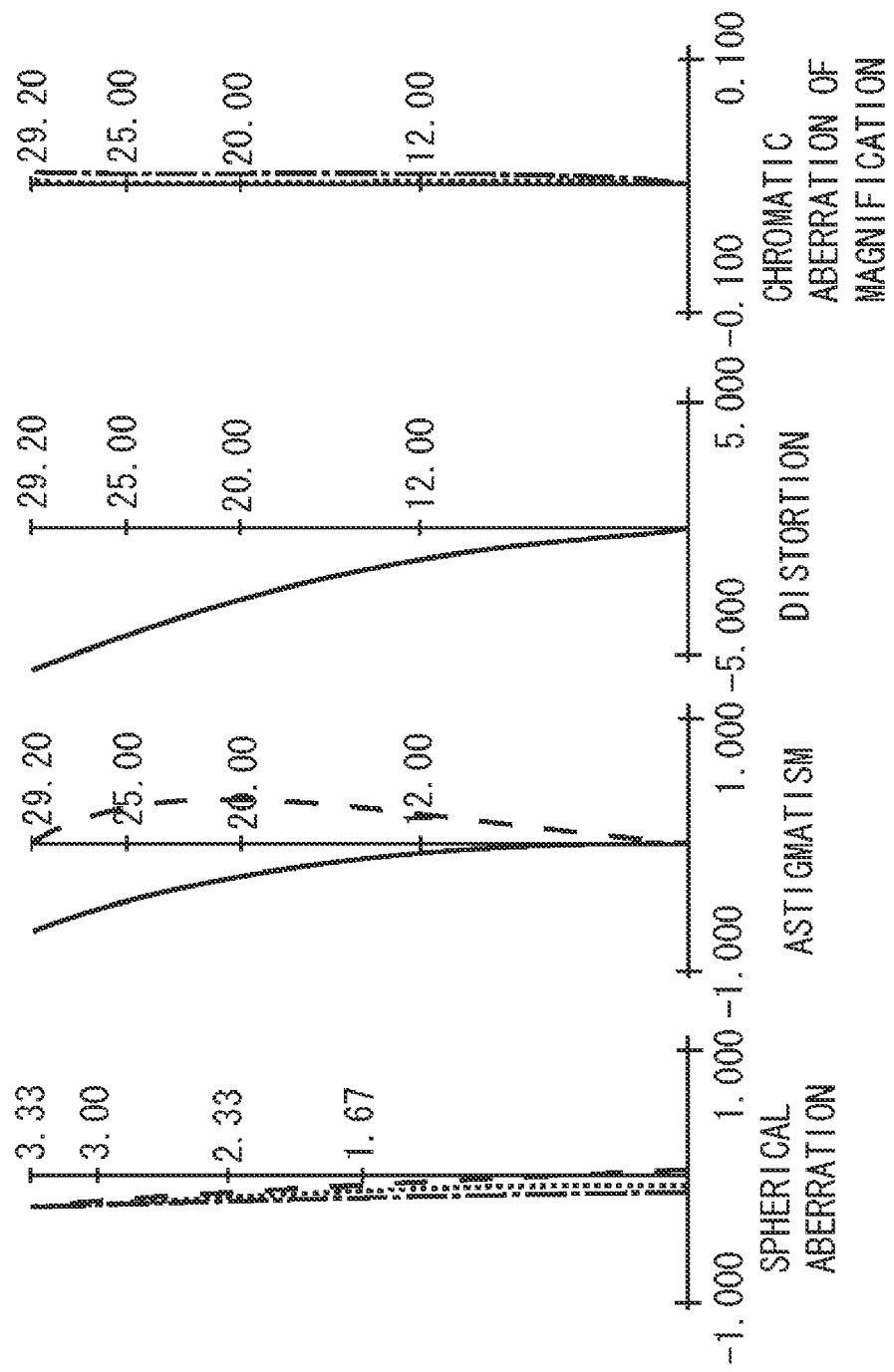

FIG. 4 is a lens cross section of a photographic lens according to a second exemplary embodiment of the present invention. FIGS. 5A and 5B are aberration charts of the photographic lens according to the second exemplary embodiment of the present invention. FIG. 6 illustrates examples of mechanisms for moving and retaining the photographic lens according to the second exemplary embodiment of the present invention.

Figure 8B:
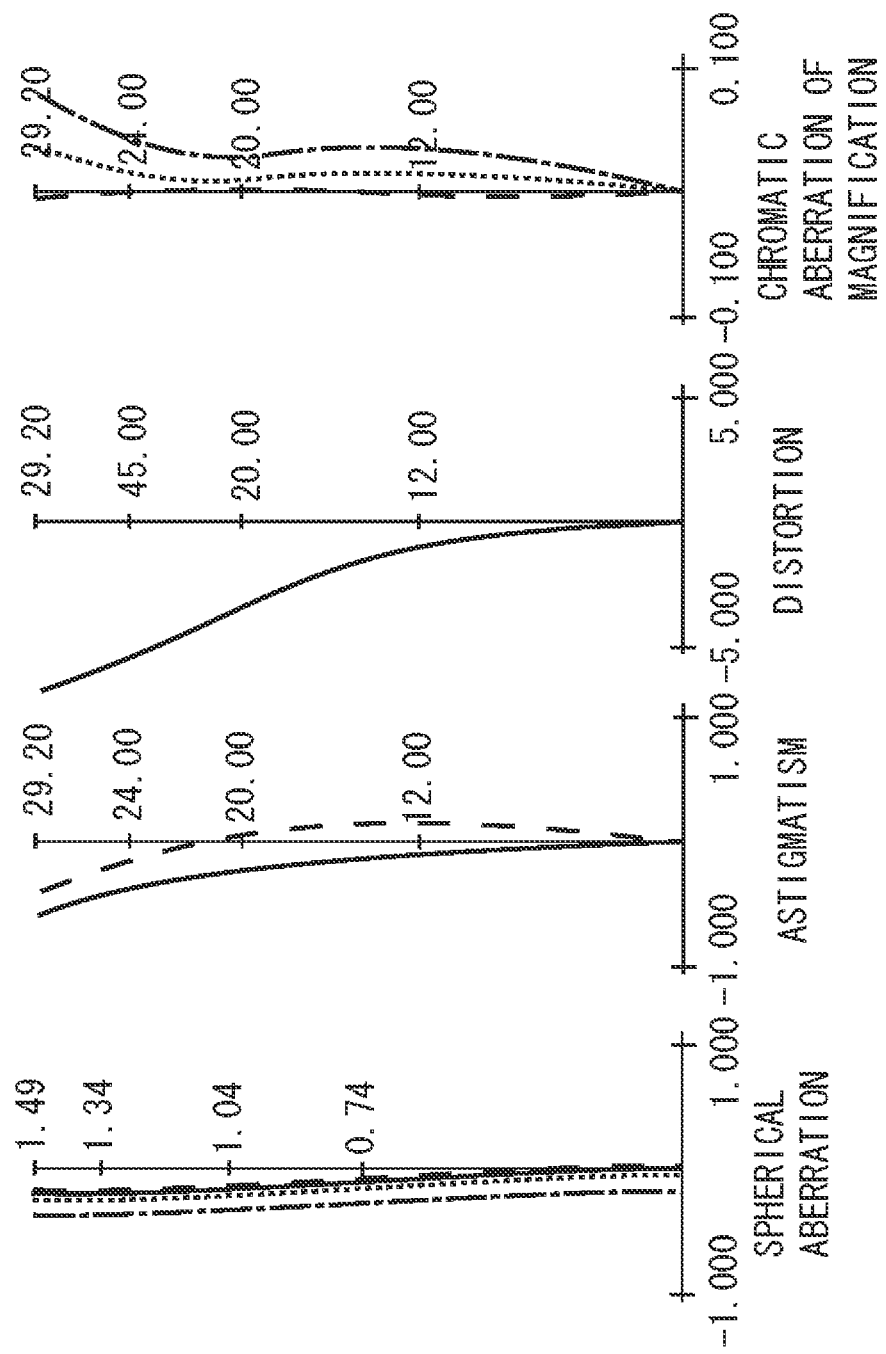

FIG. 7 is a lens cross section of a photographic lens according to a third exemplary embodiment of the present invention. FIGS. 8A and 8B are aberration charts of the photographic lens according to the third exemplary embodiment of the present invention. FIG. 9 illustrates examples of mechanisms for moving and retaining the photographic lens according to the third exemplary embodiment of the present invention.

Figure 10:
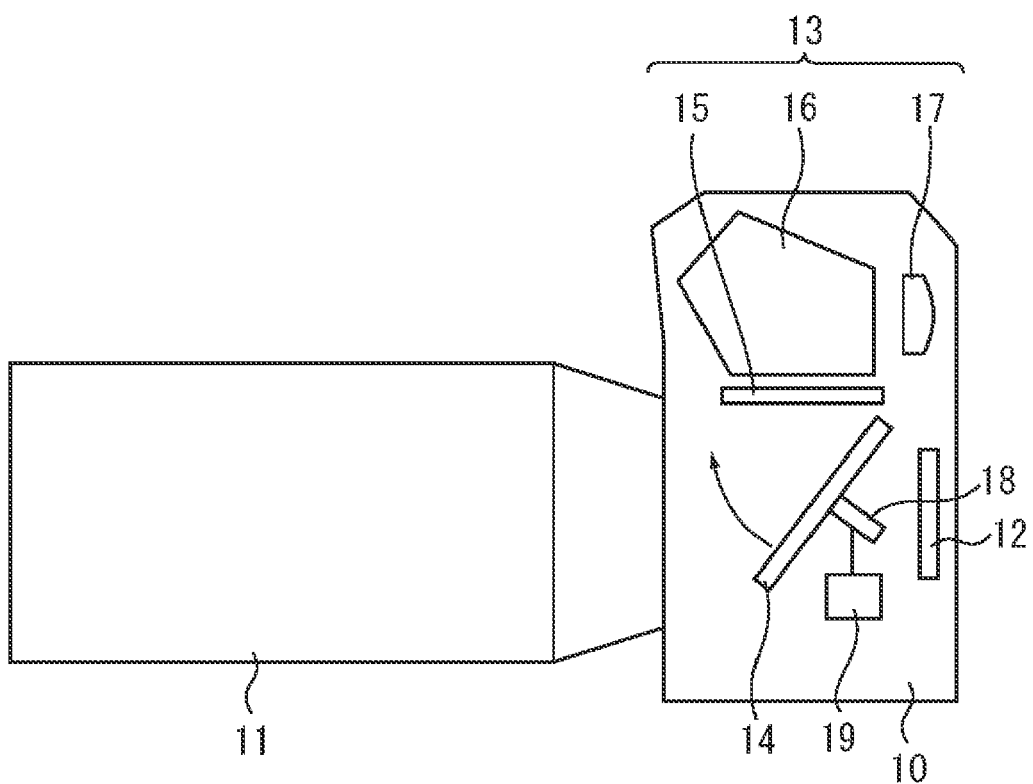
FIG. 10 illustrates exemplary main components of an image pickup apparatus according to an exemplary embodiment of the present invention.

FIG. 10 illustrates exemplary main components of an image pickup apparatus that uses the photographic lens according to an exemplary embodiment of the present invention. In each of the diagrams showing a cross section of a photographic lens (FIGS. 1, 4, and 7), the object side (front side) is shown at a left-hand portion of the drawing, and the image side (back side) is shown at a right-hand portion thereof. In each of the diagrams showing a cross section of a photographic lens (FIGS. 1, 4, and 7), "i" denotes the order of a lens unit from the object side and "Li" denotes an i-th lens unit.

In addition, in each of the diagrams showing a cross section of a photographic lens (FIGS. 1, 4, and 7), the photographic lens according to each exemplary embodiment includes a first lens unit L1 having a negative refractive power (optical power=the reciprocal of the focal length), a second lens unit L2 having a positive refractive power, and a third lens unit L3 having a positive refractive power.

An aperture stop SP is disposed on the object side of the third lens unit L3. "IP" denotes an image plane. The image plane IP is, when the photographic lens of the present invention is used as a photographic optical system of a video camera or a digital still camera, equivalent to an imaging plane of a solid-state image sensor (photoelectric conversion element) such as a charge-coupled device (CCD) sensor or a complementary metal-oxide semiconductor (CMOS) sensor. The image plane IP is, when the optical system is used as a photographic optical system of a silver-halide film camera, equivalent to a film (photosensitive) surface.

In each of the aberration charts (FIGS. 2A and 2B, 3A and 3B, and 8A and 8B), spherical aberration, astigmatism, distortion, and chromatic aberration of magnification are illustrated in this order from the left. In addition, in each of the aberration charts (FIGS. 2A and 2B, 3A and 3B, and 8A and 8B), a solid line indicates d-line light (wavelength: 587.6 nm), a dashed line indicates C-line light (wavelength: 656.3 nm), a broken line indicates F-line light (wavelength: 486.1 nm), a chain double-dashed line indicates g-line light (wavelength: 435.8 nm).

Furthermore, in a portion of each of the aberration charts (FIGS. 2A and 2B, 3A and 3B, and 8A and 8B) illustrating astigmatism, a solid line indicates a sagittal image plane in relation to d-line light while a broken line indicates a meridional image plane in relation d-line light. "ω" denotes a half angle of view, and "fno" denotes an F-number. In a portion of each of the aberration charts (FIGS. 2A and 2B, 3A and 3B, and 8A and 8B) illustrating distortion, distortion in relation to d-line light is presented.

In each of the drawings illustrating an example of a mechanism for retaining the photographic lens (FIGS. 3, 6, and 9), "CR" denotes a lens unit moving mechanism, and "K2" and "K3" respectively denote lens barrels that contain the second lens unit L2 and the third lens unit L3. Furthermore, "A2" and "A3" respectively denote members for retaining the second lens unit L2 and the third lens unit L3.

In each exemplary embodiment, each lens unit and the aperture stop SP are moved in a manner indicated by an arrow during focusing from an infinitely distant object to a closest distance object. More specifically, during focusing from an infinitely distant object to a closest distance object, the first lens unit L1 stays stationary while the second lens unit L2 moves towards the image side and the third lens unit L3 moves towards the object side.

In each exemplary embodiment, an image forming magnification of the second lens unit during focusing on an infinitely distant object ($\beta 2N$) is set to be higher than the equal magnification so that a sensitivity of the second lens unit during focusing can become high. By increasing the sensitivity of the second lens unit during focusing, each exemplary embodiment can reduce the amount of movement of the second lens unit during focusing.

Accordingly, the first lens unit in each exemplary embodiment can have such a configuration that the height of passage of a principal ray of an off-axis light flux does not greatly vary. More specifically, an image forming magnification of the second lens unit L2 during focusing on a closest distance object ($\beta 2N$) satisfies the following condition:

$$\beta 2N > 1 \tag{1}$$

If the image forming magnification of the second lens unit L2 is smaller than the equal magnification and if the second lens unit L2 is moved towards the image side, then the second lens unit L2 cannot have a high sensitivity for focusing.

In addition, in each exemplary embodiment, the third lens unit having a positive refractive power is moved towards the object side and the second lens unit having a positive refractive power is moved towards the image side. Thus, in each exemplary embodiment, the height H of a principal ray of an off-axis light flux in the first lens unit can be made almost constant. Accordingly, each exemplary embodiment can reduce variation on the image plane.

The above-described configuration can implement the present invention. It is further useful for an exemplary embodiment to satisfy the following conditions.

More specifically, in each exemplary embodiment of the present invention, a movement mechanism configured to move each lens unit during focusing and a retaining mechanism configured to retain each lens unit are engaged to each other at a location on the object side of a lens surface of each lens unit that is located closest to the object side.

In a conventional photographic lens, in a front lens unit, the engagement portion between the retaining mechanism and the moving mechanism of each lens unit is located at a location closer to the image side than the surface of the lens of the front lens unit closest to the image side. In a rear lens unit, the engagement portion between the retaining mechanism and the moving mechanism of each lens unit is located at a location closer to the object side than the surface of the lens of the rear lens unit closest to the object side.

Accordingly, the optical axis is inclined towards the opposite side due to the weight of each lens unit. Therefore, the variation on the image plane that occurs due to the inclination of the optical axis of each lens unit affects the optical performance. Thus, the optical performance of the conventional method may degrade.

In the photographic lens of each exemplary embodiment of the present invention, the two positive lens units located across the aperture stop SP have the mutually different sign for the height H of passage of a principal ray of an off-axis light flux. Accordingly, in each exemplary embodiment, the engagement portion of the retaining member, which retains each lens unit, and the moving mechanism is located on the same side (the object side) for each of the lens units. Thus, each exemplary embodiment can lessen the variation on the image plane that may occur due to inclination of each lens unit by controlling the inclination of the optical axis occurring due to the weight of each lens unit on the same side.

In addition, in the photographic lens of each exemplary embodiment of the present invention, a focal length of the entire photographic lens (f), focal lengths of respective lens units (f1, f2, f3), the distance from a lens surface of the third lens unit L3 located closest to the image side to the image plane (bf) satisfy the following conditions:

$$2.0 < bf/f < 5.5 \tag{2}$$

$$0.5 < |f1/f| < 2.0 \tag{3}$$

$$2.0 < f2/f < 6.0 \tag{4}$$

$$2.0 < f3/f < 6.0 \tag{5}$$

If the upper limit value of the condition (2) is exceeded, then the refractive power of each lens unit becomes too great. In this case, it becomes difficult to correct distortion.

On the other hand, if the lower limit value of the condition (2) is exceeded, then the height H of passage of a peripheral ray of an on-axis light flux through the third lens unit L3 may become low. In this case, it becomes necessary to increase the refractive power of the third lens unit L3 so that the image forming magnification of the second lens unit L2 becomes positive. Accordingly, the optical performance may degrade.

If the upper limit value of the condition (3) is exceeded, then the principal point of the rear lens unit cannot be moved towards the image side. In this case, it becomes difficult to secure a sufficiently long back focus.

On the other hand, if the lower limit value of the condition (3) is exceeded, too much distortion and curvature of field may occur.

If the upper limit value of the condition (4) is exceeded, then the amount of movement of the second lens unit L2 during focusing may increase. Accordingly, the size of the entire optical system may become great. On the other hand, if the lower limit value of the condition (4) is exceeded, then the height H of passage of a principal ray of an off-axis light flux through the first lens unit L1 may become low. Accordingly, the optical performance may degrade.

If the upper limit value of the condition (5) is exceeded, then the amount of movement of the third lens unit L3 during focusing may become so great that the size of the entire optical system may become great. On the other hand, if the lower limit value of the condition (5) is exceeded, then the height H of passage of a principal ray of an off-axis light flux through the first lens unit L1 may become so high that the optical performance may degrade.

In each exemplary embodiment, the range of the values in the conditions (2) through (5) can be altered as follows:

$$2.1 < bf/f < 5.0 \tag{2a}$$

$$0.6 < |f1/f| < 1.2 \tag{3a}$$

$$2.1 < f2/f < 5.5 \tag{4a}$$

$$2.1 < f3/f < 3.5 \tag{5a}$$

In the photographic lens according to an exemplary embodiment of the present invention, it is useful if the amount of movement of the second lens unit L2 in relation to that of the third lens unit L3 during focusing on an infinitely distant object is different from the amount of movement of the second lens unit L2 in relation to that of the third lens unit L3 during focusing on a closest distance object.

If the second lens unit L2 is moved by the amount of movement proportional to that of the third lens unit L3, then the height H of passage of a principal ray of an off-axis light flux through the first lens unit L1 cannot be appropriate. Accordingly, variation on the image plane may occur.

It is particularly useful if the ratio of the amount of movement of the second lens unit L2 to that of the third lens unit L3 during focusing on an infinitely distant object is greater than the ratio of the amount of movement of the second lens unit L2 to that of the third lens unit L3 during focusing on a closest distance object, as in the first and third exemplary embodiments. Accordingly, variation of the height H of passage of a principal ray of an off-axis light flux through the first lens unit L1 can be effectively prevented.

Numerical examples 1 through 3, which respectively correspond to the first through third exemplary embodiments of the present invention, are set forth below. In each of the numerical examples 1 through 3, "surface number" denotes the order of each optical surface from an enlargement conjugate side, "r" denotes a radius of curvature of each optical surface, "d" denotes a thickness of the optical member or an air interval between adjacent surfaces, "nd" and "vd" respectively denote a refractive index and an Abbe number of each optical member with respect to d-line light. "ea" denotes an effective aperture. An optical surface marked with an asterisk ("*") is an aspheric surface.

In addition, each of "A4", "A6", "A8", and "A10" denotes an aspheric coefficient. The aspheric shape is expressed as $$Sag(R) = \frac{(1/r) \times R^2}{[1 + \{1 - (1+K) \times (1/r)^2\}^{1/2} \times R^2]} + A4 \times R^4 + A6 \times R^6 + A8 \times R^8 + A10 \times R^{10}$$

where "Sag(R)" denotes a displacement from a surface vertex along the optical axis in a position with a distance "R" in a direction perpendicular to the optical axis. In each numerical example, aspheric coefficients of each aspheric surface are described.

Furthermore, "e-N" denotes "$\times 10^{-N}$". In addition, "f" denotes a focal length, "Fno" denotes an F-number, and "ω" denotes a half angle of view. "Y" denotes an image height. "L" denotes a length of the lens system from the first surface to the last surface. "BF" denotes the distance from the last lens surface to the image plane.

In addition, in each numerical example, a value "Variable" of the distance between optical surfaces "d" indicates that the distance varies during focusing. In a separate table, the surface distance during focusing on an infinitely distant object, at middle focal length, and during focusing on a closest distance object is shown. Table 1 presents a result of calculation under each of the above-described condition based on lens data according to numerical examples 1 through 3, which will be described below.

Numerical Example 1

Surface data

| Surface No. | r | d | nd | vd | ea |
|---|---|---|---|---|---|
| 1 | 39.032 | 3.50 | 1.78472 | 25.7 | 65.15 |
| 2 | 27.725 | 6.93 | | | 52.01 |
| 3 | 31.865 | 3.50 | 1.58313 | 59.4 | 49.96 |
| 4* | 13.517 | 13.14 | | | 37.29 |
| 5 | 91.868 | 2.20 | 1.49700 | 81.5 | 35.17 |
| 6 | 15.964 | 7.78 | | | 25.45 |
| 7 | 107.797 | 7.29 | 1.65412 | 39.7 | 23.40 |
| 8 | −19.345 | 1.40 | 1.83481 | 42.7 | 21.11 |
| 9 | 35.295 | 1.50 | | | 18.74 |
| 10 | 44.257 | 6.95 | 1.65412 | 39.7 | 18.39 |
| 11 | −13.418 | 1.00 | 1.77250 | 49.6 | 17.44 |
| 12 | −62.398 | Variable | | | 16.76 |
| 13 | 48.270 | 8.00 | 1.74950 | 35.3 | 15.73 |
| 14 | −73.913 | Variable | | | 14.78 |
| 15 (stop) | ∞ | 0.50 | | | 13.87 |
| 16 | 33.082 | 2.88 | 1.59270 | 35.3 | 13.89 |
| 17 | −68.298 | 0.70 | | | 13.62 |
| 18 | −159.710 | 1.00 | 1.83400 | 37.2 | 13.30 |
| 19 | 13.505 | 4.58 | 1.56732 | 42.8 | 12.87 |
| 20 | −20.235 | 1.15 | | | 12.86 |
| 21 | −15.707 | 1.00 | 1.83400 | 37.2 | 12.51 |
| 22 | 92.413 | 0.15 | | | 13.52 |
| 23 | 37.208 | 4.78 | 1.49700 | 81.5 | 14.14 |
| 24 | −17.223 | 0.15 | | | 15.80 |
| 25 | 323.333 | 1.20 | 1.83400 | 37.2 | 17.38 |
| 26 | 20.255 | 7.45 | 1.49700 | 81.5 | 18.57 |
| 27 | −32.065 | 0.15 | | | 21.17 |
| 28 | −1491.679 | 1.75 | 1.80518 | 25.4 | 22.68 |
| 29 | −136.318 | Variable | | | |

Numerical Example 2

Surface data

| Surface No. | r | d | nd | vd | ea |
|---|---|---|---|---|---|
| 1 | ∞ | 1.60 | | | 72.09 |
| 2 | 52.438 | 3.80 | 1.58313 | 59.4 | 50.09 |
| 3* | 13.780 | 7.50 | | | 32.69 |
| 4 | 32.841 | 1.80 | 1.84666 | 23.8 | 32.31 |
| 5 | 17.276 | 7.09 | | | 27.09 |
| 6 | 280.581 | 6.33 | 1.68893 | 31.1 | 26.65 |
| 7 | −26.041 | 1.40 | 1.83400 | 37.2 | 25.77 |
| 8 | −190.133 | 2.93 | | | 24.85 |
| 9 | −27.873 | 1.40 | 1.49700 | 81.5 | 24.61 |
| 10 | 64.649 | 0.16 | | | 24.85 |
| 11 | 45.028 | 6.86 | 1.51633 | 64.1 | 25.09 |
| 12 | −31.077 | Variable | | | 25.10 |
| 13 | 114.268 | 3.44 | 1.71736 | 29.5 | 20.64 |
| 14 | −94.694 | Variable | | | 20.87 |
| 15 (Stop) | ∞ | 0.05 | | | 20.92 |
| 16 | 19.207 | 5.21 | 1.65412 | 39.7 | 20.93 |
| 17 | 544.261 | 0.50 | | | 19.85 |
| 18 | 92.444 | 1.00 | 1.88300 | 40.8 | 19.11 |
| 19 | 12.142 | 7.13 | 1.51742 | 52.4 | 17.04 |
| 20 | −33.287 | 0.86 | | | 16.47 |
| 21 | −21.599 | 0.90 | 1.83400 | 37.2 | 16.28 |
| 22 | 47.336 | 0.15 | | | 16.47 |
| 23 | 28.073 | 5.47 | 1.49700 | 81.5 | 16.76 |
| 24 | −23.879 | 0.15 | | | 17.26 |
| 25 | 443.582 | 1.10 | 1.88300 | 40.8 | 18.22 |
| 26 | 19.175 | 6.66 | 1.49700 | 81.5 | 19.33 |
| 27 | −40.453 | 0.15 | | | 21.43 |
| 28 | −92.418 | 1.58 | 1.84666 | 23.8 | 22.30 |
| 29 | −57.612 | Variable | | | |

Surface data (continued)

Aspheric Coefficients

| r4 | K = −6.04712e−001 | A4 = 2.34342e−007 | A6 = −5.84547e−008 |
|---|---|---|---|
| | A8 = 2.31497e−010 | A10 = −8.25084e−013 | |

Various Data

| | |
|---|---|
| Focal Length | 17.30 |
| F-number | 4.08 |
| Angle of View | 59.35 |
| Image Height | 29.20 |
| Lens Total Length | 149.89 |
| BF | 52.69 |

Surface Interval Data

| Object distance | Infinite | 850 | 250 |
|---|---|---|---|
| d12 | 0.60 | 0.60 | 1.09 |
| d14 | 5.98 | 5.57 | 4.15 |
| d29 | 52.69 | 52.70 | 51.73 |

Various Data of Each Lens Unit

| Lens unit | First surface | Focal length | Lens config. length | Front principal point position | Rear principal point position |
|---|---|---|---|---|---|
| 1 | 1 | −12.06 | 55.18 | 18.70 | −23.13 |
| 2 | 13 | 40.08 | 8.00 | 1.86 | −2.85 |
| 3 | 15 | 51.74 | 27.43 | 16.90 | −3.55 |

-continued

Surface data

Aspheric Coefficients r3  K = −8.32287e−001   A4 = 1.23299e−005   A6 = −1.78962e−008
    A8 = 2.37267e−010   A10 = −7.22792e−013
    A12 = 9.89766e−016

Various Data

| | |
|---|---|
| Focal Length | 24.40 |
| F-number | 3.56 |
| Angle of View | 50.12 |
| Image Height | 29.20 |
| Lens Total Length | 152.03 |
| BF | 54.93 |

Surface Interval Data

| Object distance | Infinite | 1200 | 210 |
|---|---|---|---|
| d12 | 9.57 | 10.10 | 10.50 |
| d14 | 12.32 | 11.75 | 4.40 |
| d29 | 54.93 | 54.37 | 53.97 |

Various Data of Each Lens Unit

| Lens unit | First surface | Focal length | Lens config. length | Front principal point position | Rear principal point position |
|---|---|---|---|---|---|
| 1 | 1 | −23.74 | 40.87 | 3.98 | −35.74 |
| 2 | 13 | 72.68 | 3.44 | 1.10 | −0.91 |
| 3 | 15 | 70.34 | 30.90 | 7.71 | −17.92 |

Numerical Example 3

Surface data

| Surface No. | r | d | nd | vd | ea |
|---|---|---|---|---|---|
| 1 | 40.927 | 3.50 | 1.83400 | 37.2 | 63.10 |
| 2 | 25.540 | 6.64 | | | 47.79 |
| 3 | 29.957 | 3.70 | 1.58313 | 59.4 | 46.04 |
| 4* | 12.653 | 12.43 | | | 35.39 |
| 5 | 39.594 | 1.40 | 1.49700 | 81.5 | 29.09 |
| 6 | 12.498 | 8.89 | | | 21.62 |
| 7 | −38.096 | 1.40 | 1.49700 | 81.5 | 20.42 |
| 8 | 18.312 | 1.43 | | | 18.49 |
| 9 | 19.937 | 9.25 | 1.65412 | 39.7 | 18.51 |
| 10 | −18.357 | 1.00 | 1.83400 | 37.2 | 16.55 |
| 11 | −49.820 | Variable | | | 15.99 |
| 12 | 43.411 | 9.00 | 1.65412 | 39.7 | 14.54 |
| 13 | −38.161 | 1.00 | 1.77250 | 49.6 | 11.32 |
| 14 | 861.364 | Variable | | | 11.01 |
| 15 (Stop) | ∞ | 0.15 | | | 10.16 |
| 16 | 19.404 | 3.10 | 1.53172 | 48.8 | 10.26 |
| 17 | −60.494 | 0.63 | | | 10.11 |
| 18 | 216.053 | 0.90 | 1.88300 | 40.8 | 10.20 |
| 19 | 10.665 | 6.23 | 1.58144 | 40.8 | 10.50 |
| 20 | −9.177 | 0.80 | 1.83400 | 37.2 | 11.64 |
| 21 | 380.272 | 0.15 | | | 13.53 |
| 22 | 34.807 | 5.39 | 1.49700 | 81.5 | 15.02 |
| 23 | −15.013 | 0.15 | | | 16.51 |
| 24 | −84.060 | 1.20 | 1.88300 | 40.8 | 17.47 |
| 25 | 19.583 | 7.82 | 1.49700 | 81.5 | 18.82 |
| 26 | −32.193 | 0.15 | | | 21.71 |
| 27 | 110.597 | 2.15 | 1.78472 | 25.7 | 24.05 |
| 28 | −379.543 | Variable | | | |

-continued

Surface data

Aspheric Coefficients r4  K = −9.28167e−001   A4 = 3.48930e−006   A6 = 1.30162e−008
    A8 = −5.43156e−011   A10 = −6.51587e−013
    A12 = 1.11113e−015

Various Data

| | |
|---|---|
| Focal Length | 16.43 |
| F-number | 5.60 |
| Angle of View | 60.64 |
| Image Height | 29.20 |
| Lens Total Length | 149.26 |
| BF | 53.93 |

Surface Interval Data

| Object distance | Infinite | 850 | 250 |
|---|---|---|---|
| d11 | 0.60 | 0.63 | 1.25 |
| d14 | 6.27 | 5.78 | 3.35 |
| d28 | 53.93 | 54.01 | 53.90 |

Various Data of Each Lens Unit

| Lens unit | First surface | Focal length | Lens config. length | Front principal point position | Rear principal point position |
|---|---|---|---|---|---|
| 1 | 1 | −15.57 | 49.64 | 13.01 | −32.44 |
| 2 | 12 | 87.70 | 10.00 | −1.95 | −7.79 |
| 3 | 15 | 42.18 | 28.82 | 13.87 | −9.07 |

TABLE 1

| | Numerical Example | | |
|---|---|---|---|
| Condition | 1 | 2 | 3 |
| (1) | 13.120 | 8.952 | 2.075 |
| (2) | 3.046 | 2.251 | 3.282 |
| (3) | 0.697 | 0.973 | 0.948 |
| (4) | 2.317 | 2.979 | 5.338 |
| (5) | 2.991 | 2.883 | 2.567 |

Now, an exemplary embodiment of a single-lens reflex camera system that uses the photographic lens according to an exemplary embodiment of the present invention will be described in detail below with reference to FIG. 10.

Referring to FIG. 10, the single-lens reflex camera system includes a single lens reflex camera body 10 and an interchangeable lens 11. The interchangeable lens 11 includes the photographic lens according to an exemplary embodiment of the present invention.

A recording unit 12 includes a film, a solid-state image sensor, or the like configured to receive an image of an object formed by the interchangeable lens 11. A user of the camera can view the object image formed via the interchangeable lens 11 through a viewfinder optical system 13.

A quick return mirror 14 can pivot to transfer the object image from the interchangeable lens 11 to either of the recording unit 12 and the viewfinder optical system 13. The object image is then formed on a focusing screen 15 via the quick return mirror 14. Then, the object image is erected by a pentagonal prism 16. The user can observe the erected object image magnified by an eyepiece optical system 17.

In capturing an image, the quick return mirror 14 pivots in the direction indicated with an arrow in FIG. 10. Then, the object image is formed and recorded on the recording unit 12. In addition, the camera body 10 includes a sub mirror 18 and a focus detection unit 19.

By applying the photographic lens according to an exemplary embodiment of the present invention to an optical apparatus, such as an interchangeable lens for a single-lens reflex camera, an optical apparatus having a high optical system can be implemented. In addition, the present invention can be applied to a single lens reflex (SLR) camera having no quick return mirror and the same effect as described above can also be implemented in this case.

According to an exemplary embodiment of the present invention having the above-described configuration, a small-size photographic lens, having a high optical performance and useful in a photographic optical system that uses a solid-state image sensor, and an image pickup apparatus having the photographic lens can be implemented.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-034039 filed Feb. 17, 2009, which is hereby incorporated by reference herein in its entirety.

What is claimed is:

1. A photographic lens comprising, in order from an object side to an image side:
   a first lens unit having a negative refractive power;
   a second lens unit having a positive refractive power;
   a stop; and
   a third lens unit having a positive refractive power,
   wherein the third lens unit moves towards the object side while the second lens unit moves towards the image side during focusing from an infinitely distant object to a closest distance object, and
   wherein an image forming magnification of the second lens unit during focusing on a closest distance object ($\beta 2N$) satisfies the following condition:

$\beta 2N > 1$.

2. The photographic lens according to claim 1, wherein a moving mechanism configured to move each lens unit during focusing and a retaining mechanism configured to retain each lens unit are engaged at a location closer to the object side than a lens surface of the lens unit located closest to the object side.

3. The photographic lens according to claim 1, wherein respective focal lengths of the first lens unit, the second lens unit, and the third lens unit (f1, f2, f3), a focal length of the entire photographic lens (f), and a distance from a lens surface of the third lens unit located closest to the image side to an image plane (bf) satisfy the following conditions:

$2.0 < bf/f < 5.5$ $0.5 < |f1/f| < 2.0$ $2.0 < f2/f < 6.0$ $2.0 < f3/f < 6.0$.

4. The photographic lens according to claim 1, wherein an amount of movement of the second lens unit relative to an amount of movement of the third lens unit during focusing on a closest distance object is greater than that during focusing on an infinitely distant object.

5. An image pickup apparatus comprising the photographic lens according to claim 1.

6. The photographic lens according to claim 1,
   wherein a moving mechanism configured to move the second lens unit during focusing and a retaining mechanism configured to retain the second lens unit are engaged at a location closer to the object side than a lens surface of the second lens unit located closest to the object side, and
   wherein a moving mechanism configured to move the third lens unit during focusing and a retaining mechanism configured to retain the third lens unit are engaged at a location closer to the object side than a lens surface of the third lens unit located closest to the object side.

* * * * *